(12) United States Patent
Lee (10) Patent No.: US 11,785,191 B2
(45) Date of Patent: Oct. 10, 2023

(54) PROJECTION PICTURE CORRECTION SYSTEM AND ELECTRONIC EQUIPMENT AND PROJECTOR THEREOF

(71) Applicant: ASUSTeK COMPUTER INC., Taipei (TW)

(72) Inventor: Jian-Hui Lee, Taipei (TW)

(73) Assignee: ASUSTEK COMPUTER INC, Taipei (TW)

( * ) Notice: Subject to any disclaimer, the term of this patent is extended or adjusted under 35 U.S.C. 154(b) by 134 days.

(21) Appl. No.: 17/023,888

(22) Filed: Sep. 17, 2020

(65) Prior Publication Data

US 2021/0099683 A1 Apr. 1, 2021

(30) Foreign Application Priority Data

Oct. 1, 2019 (TW) ................................ 108135589

(51) Int. Cl.
 *G03B 21/14* (2006.01)
 *H04N 9/31* (2006.01)
 *G06T 1/20* (2006.01)

(52) U.S. Cl.
 CPC ......... *H04N 9/3185* (2013.01); *G03B 21/147* (2013.01); *G06T 1/20* (2013.01)

(58) Field of Classification Search
 CPC ........ G03B 21/14; G03B 21/147; H04N 9/31; H04N 9/3185; G06T 1/20
 USPC .................................................... 353/69, 70
 See application file for complete search history.

(56) References Cited

U.S. PATENT DOCUMENTS

| | | | | |
|---|---|---|---|---|
| 6,305,805 B1 * | 10/2001 | Liebenow | ................ | H04N 5/74 353/69 |
| 7,973,795 B2 * | 7/2011 | Miyazawa | ............. | G09G 5/003 353/69 |
| 8,300,063 B2 * | 10/2012 | Fujimori | ............. | H04N 9/3185 345/589 |
| 8,449,119 B2 * | 5/2013 | Cudak | .................... | G03B 17/54 353/30 |
| 10,496,352 B2 | 12/2019 | Liao | | |
| 2007/0058090 A1 * | 3/2007 | Fujimori | ............. | H04N 9/3185 348/E9.027 |
| 2007/0222798 A1 * | 9/2007 | Kuno | .................... | H04N 5/272 345/634 |

(Continued)

FOREIGN PATENT DOCUMENTS

| | | |
|---|---|---|
| CN | 1945421 A | 4/2007 |
| CN | 106210679 B | 12/2016 |
| CN | 106803946 B | 6/2017 |

*Primary Examiner* — Ryan D Howard
(74) *Attorney, Agent, or Firm* — McClure, Qualey & Rodack, LLP (57) ABSTRACT

A projection picture correction system, and an electronic equipment and a projector thereof are provided. The projection picture correction system includes a projector and a processing device. The projector is for providing keystone correction parameters. The processing device connects to the projector through a data transfer interface to receive the keystone correction parameters from the projector, performs a keystone correction on at least one picture according to the keystone correction parameters and generates a corrected picture, and connects to the projector through an image transmission interface to transmit the corrected picture to the projector for projection.

7 Claims, 6 Drawing Sheets

(56) References Cited

U.S. PATENT DOCUMENTS

2012/0314191 A1\* 12/2012 Fujimori .............. G03B 21/145
  353/121
2022/0038669 A1\* 2/2022 Ide .......................... G06F 3/044

\* cited by examiner

PROJECTION PICTURE CORRECTION SYSTEM AND ELECTRONIC EQUIPMENT AND PROJECTOR THEREOF

CROSS-REFERENCE TO RELATED APPLICATION

This application claims the priority benefit of Taiwan application serial No. 108135589, filed on Oct. 1, 2019. The entirety of the above-mentioned patent application is hereby incorporated by reference herein and made a part of specification.

BACKGROUND OF THE INVENTION

Field of the Invention

The invention relates to a projection picture correction system and an electronic equipment and a projector thereof.

Description of the Related Art

When using the projector, the projector should be placed at a right angle to the projection screen as much as possible to ensure the projection quality. If the placement of the projector and the projection screen are not kept perpendicular, the projection picture will be distorted and keystone distortion happened, which leads to poor visual perception during the user watching the screen. Under this circumstance, the keystone correction function is used to correct the trapezoidal picture to a standard rectangular picture.

The keystone correction function of the current projector is mostly achieved by an image processing chip inside the projector. It is roughly divided into two ways, one is that the user manually adjusts the screen display (OSD) of the projector to perform the keystone correction; the other way is to use a gravity sensor (G-sensor) in the projector to sense the inclination angle of the projector, and then the image processing chip calculates and automatically performs the keystone correction. However, if the image processing chip does not have the image correction function, or the projection picture requires higher resolution and screen refresh rate, it will result in insufficient performance of the image processing chip, and failure to provide the keystone correction or significant picture delay.

BRIEF SUMMARY OF THE INVENTION

According to the first aspect, a projection picture correction system is provided. The projection picture correction system includes a projector and a processing device. The projector is configured to provide keystone correction parameters. The processing device is connected with the projector through a data transfer interface to receive the keystone correction parameters from the projector, the processing device performs a keystone correction on at least one picture according to the keystone correction parameters and generates a corrected picture, and transmits the corrected picture to the projector through an image transmission interface, for projection.

According to the second aspect, an electronic equipment adapted to be used with a processing device is also provided. The projector is configured to generate keystone correction parameters. The electronic equipment includes a data transfer interface, a processing device, and an image transmission interface. The data transfer interface is connected to the projector, for receiving the keystone correction parameters from the projector. The processing device is connected to the data transfer interface, for receiving the keystone correction parameters from the data transfer interface, performing a keystone correction on at least one picture and generating a corrected picture according to the keystone correction parameters. The image transmission interface is connected to the processing device, for transmitting the corrected picture received from the processing device.

According to the third aspect, a projector adapted to be used with a processing device is provided. The projector includes a projection lens, a processor, a data transfer interface, and an image transmission interface. The processor is electrically connected to the projection lens, and configured to generate keystone correction parameters. The data transfer interface is electrically connected to the processor. The image transmission interface is electrically connected to the processor. The processor is connected to the processing device through the data transfer interface and transmits the keystone correction parameters to the processing device. The processing device performs a keystone correction on at least one picture and generates a corrected picture according to the keystone correction parameters, and the processor is connected to the processing device through the image transmission interface to receive the corrected picture from the processing device and transmits the corrected picture to the projection lens for projection.

In summary, the keystone correction of the picture is performed through the external processing device. The projector don't need to do the keystone correction itself. Therefore, it is possible to avoid screen delay during the projection of the projector and increase the smoothness of the projection picture.

These and other features, aspects and advantages of the present invention will become better understood with regard to the following description, appended claims, and accompanying drawings.

DETAILED DESCRIPTION OF THE EMBODIMENTS

Figure 1:
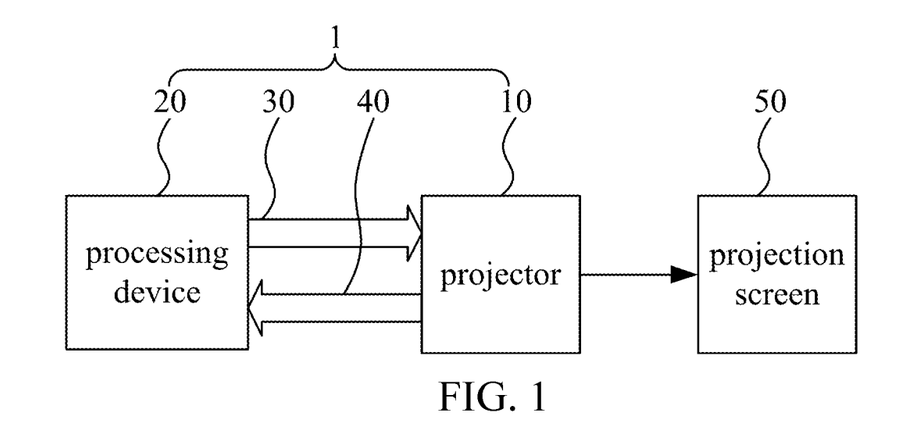
FIG. 1 is a schematic structural diagram of a projection picture correction system according to an embodiment.

FIG. 1 is a schematic structural diagram of a projection picture correction system according to an embodiment. Please refer to FIG. 1. A projection picture correction system 1 includes a projector 10 and a processing device 20. The processing device 20 is connected to the projector 10 to form an image transmission channel 30 and a data transmission channel 40.

Figure 2:
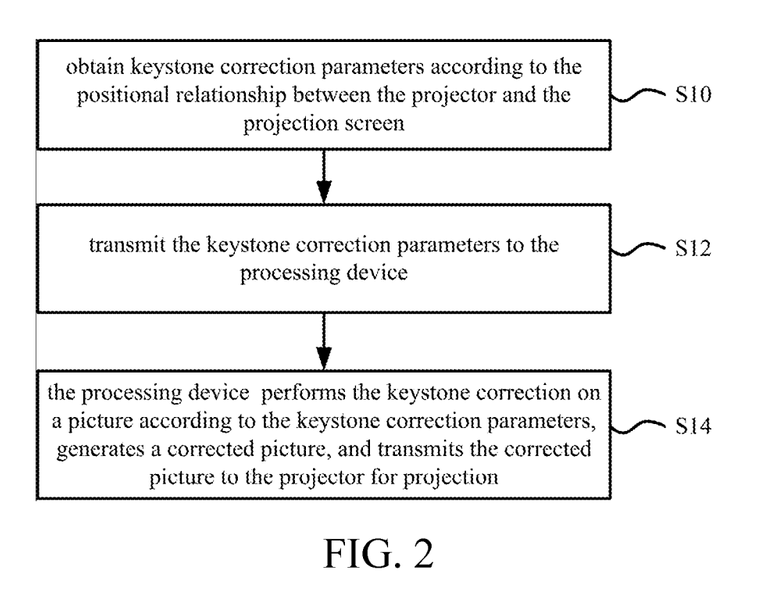
FIG. 2 is a schematic flowchart of performing a projection picture correction according to an embodiment.

FIG. 2 is a schematic flowchart of performing a projection picture correction according to an embodiment. Please refer to FIG. 1 and FIG. 2. As shown in step S10, the projector 10 generates keystone correction parameters. In an embodiment, the keystone correction parameters include the optical parameters of the projector 10 and the position relationship between the projector 10 and a projection screen 50. The optical parameters include throw ratio, optical offset, etc. The positional relationship between the projector 10 and the projection screen 50 is sensing values sensed by an orientation sensor inside the projector 10. As shown in step S12, the projector 10 transmits the keystone correction parameters to the processing device 20 through the data transmission channel 40. Then, as step S14, the processing device 20 performs the keystone correction on at least one picture according to the keystone correction parameters to generate a corrected picture, and the corrected picture is transmitted to the projector 10 through the image transmission channel 30 for projecting the corrected picture on the projection screen 50. In an embodiment, the keystone correction is a vertical keystone correction or a horizontal keystone correction. Since the corrected picture is performed the keystone correction by the processing device 20 in advance, the picture projected by the projector 10 presents a standard rectangular picture.

The processing device 20 is a component independent of the projector set in an external electronic equipment, or it is an independent relay image processing device. The following is a detailed description of the technical content for different implementation aspects.

Figure 3:
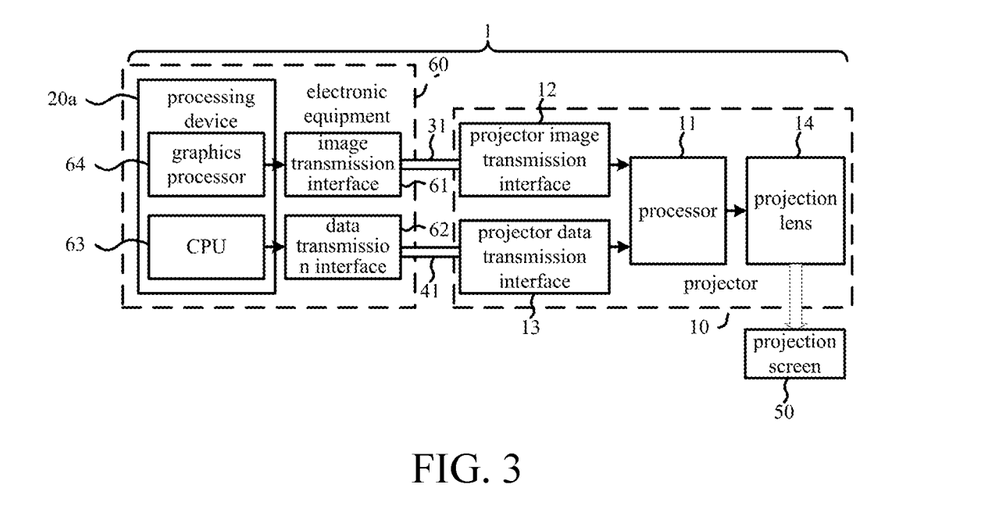
FIG. 3 is a block diagram of the projection picture correction system according to a first embodiment of the present invention.

Please refer to the first embodiment shown in FIG. 3. A projector 10 includes a processor 11. The processor 11 is electrically connected to a projector image transmission interface 12, a projector data transfer interface 13 and a projection lens 14. An electronic equipment 60 includes a processing device 20a, an image transmission interface 61, and a data transfer interface 62. The processing device 20a includes a central processing unit (CPU) 63 and a graphics processor 64. The CPU 63 is electrically connected to the graphics processor 64 and the data transfer interface 62, and the graphics processor 64 is electrically connected to the image transmission interface 61. When the projector image transmission interface 12 is connected to the image transmission interface 61 of the electronic equipment 60 through an image transmission cable 31, and the image transmission channel 30 as shown in FIG. 1 is formed by the projector image transmission interface 12, the image transmission cable 31, and the image transmission interface 61. When the projector data transfer interface 13 is connected to the data transfer interface 62 of the electronic equipment 60 through the data transmission cable 41, the wired data transmission channel 40 as shown in FIG. 1 is formed by the projector data transfer interface 13, the data transmission cable 41, and the data transfer interface 62.

The processor 11 in the projector 10 generates the keystone correction parameters, and transmits the keystone correction parameters to the data transfer interface 62 by the projector data transfer interface 13 and the data transmission cable 41. The CPU 63 of the processing device 20a in the electronic equipment 60 receives the keystone correction parameters from the data transfer interface 62. Then, the CPU 63 transmits the keystone correction parameters and a picture to the graphics processor 64. The graphics processor 64 receives the instructions of the CPU 63, performs the keystone correction on the picture according to the keystone correction parameters, generates a corrected picture, and transmits the corrected picture to the processor 11 of the projector 10 through the image transmission interface 61, the image transmission cable 31, and the projector image transmission interface 12 sequentially. The processor 11 projects the corrected picture on the projection screen 50 through the projection lens 14. In this embodiment, the projector image transmission interface 12 and the image transmission interface 61 are connecting ports for connecting the image transmission cable 31, and the projector data transfer interface 13 and the data transfer interface 62 are connecting ports for connecting the data transmission cable 41.

In other embodiments, the data transfer interface and the projector data transfer interface are wireless communication interfaces. Please refer to a second embodiment in FIG. 4. A projector 10 includes a processor 11, a projector image transmission interface 12, a projector wireless communication interface 15 used as the data transfer interface, and projection lens 14. The electronic equipment 60 includes the processing device 20a, the image transmission interface 61, and the wireless communication interface 65 used as the data transfer interface. The CPU 63 in the processing device 20a is electrically connected to the graphics processor 64 and the wireless communication interface 65, and the graphics processor 64 is electrically connected to the image transmission interface 61. When the projector image transmission interface 12 of the projector 10 is connected to the image transmission interface 61 of the electronic equipment 60 through the image transmission cable 31, the image transmission channel 30 as shown in FIG. 1 is formed by the projector image transmission interface 12, the image transmission cable 31, and the image transmission interface 61. When the projector wireless communication interface 15 of the projector 10 is connected to the wireless communication interface 65 of the electronic equipment 60 through the wireless communication connection channel 42, the wireless data transmission channel 40 shown in FIG. 1 is formed by the projector wireless communication interface 15, the wireless communication connection channel 42 and the wireless communication interface 65. The projector wireless communication interface 15 of the projector 10 and the wireless communication interface 65 of the electronic equipment 60 is paired or configured to establish a wireless communication connection channel according to the wireless communication standard. In one embodiment, the wireless communication standard is any standard communication protocol, such as Bluetooth or Wi-Fi transmission methods, which is not limited herein.

Figure 4:
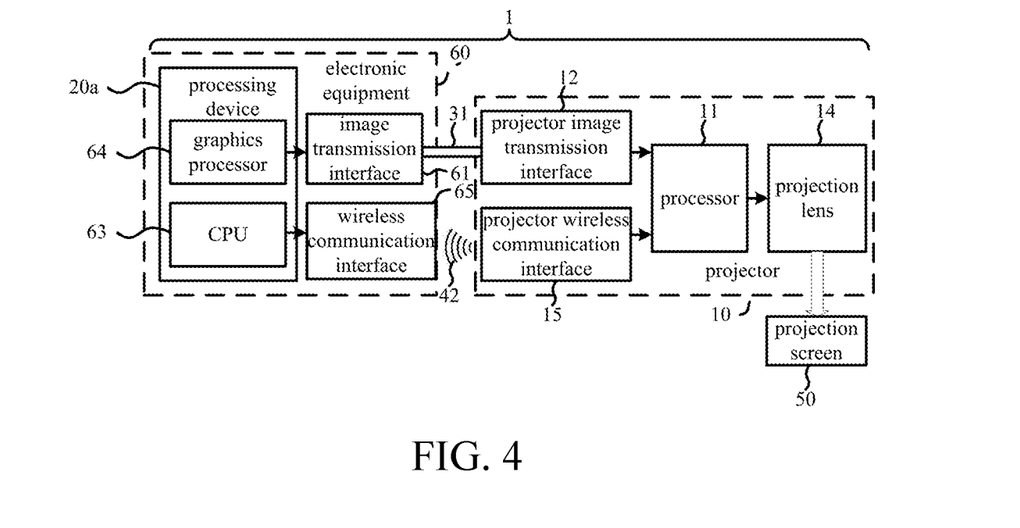
FIG. 4 is a block diagram of the projection picture correction system according to a second embodiment.

The processor 11 of the projector 10 generates the keystone correction parameters, which includes the optical parameters of the projector 10 and the positional relationship between the projector 10 and the projection screen 50. Then, the keystone correction parameters are transmitted to the CPU 63 of the processing device 20a of the electronic equipment 60 through the projector wireless communication interface 15, the wireless communication connection channel 42 and the wireless communication interface 65 in sequence. The CPU 63 transmits the keystone correction parameters and the picture to the graphics processor 64. The graphics processor 64 receives the instructions of the CPU 63 and performs the keystone correction on the picture according to the keystone correction parameters, generates a corrected picture, and transmits the corrected picture to the processor 11 of the projector 10 through the image transmission interface 61, the image transmission cable 31, and the projector image transmission interface 12 in sequence. Then, the processor 11 projects the corrected picture on the projection screen 50 through the projection lens 14.

In some embodiments, the electronic equipment 60 is, but is not limited to, a mobile phone, a notebook computer, a desktop computer, a tablet computer, a personal digital assistant (PDA), and the like.

Figure 5:
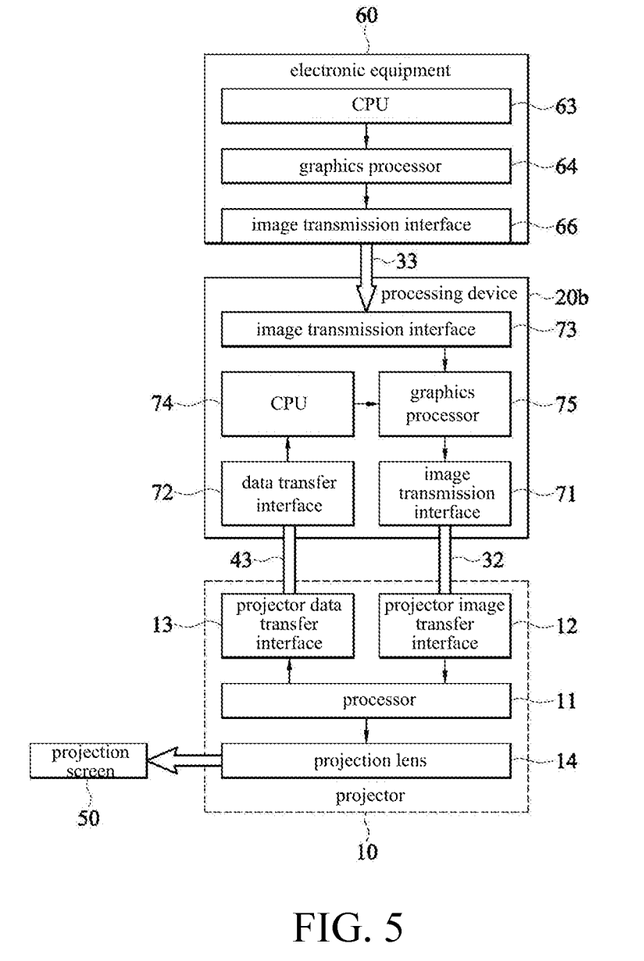
FIG. 5 is a block diagram of the projection picture correction system according to a third embodiment.

Please refer to the third embodiment shown in FIG. 5. In this embodiment, a processing device 20b is directly and independently connected between a projector 10 and an electronic equipment 60 for relay image processing. The structure of the projector 10 is the same as the first embodiment, which will not be repeated here. The processing device 20b includes an image transmission interface 71, a data transfer interface 72, an image transmission interface 73, a CPU 74, and a graphics processor 75. The CPU 74 is electrically connected to the data transfer interface 72 and the graphics processor 75, and the graphics processor 75 is electrically connected to the image transmission interface 71 and the image transmission interface 73. In this embodiment, the processing device 20b is an image stitching fusion processor. The image transmission interface 71 is connected to the projector 10 of the projector image transmission interface 12 through the image transmission cable 32. When the data transfer interface 72 is connected to the projector data transfer interface 13 of the projector 10 through the data transmission cable 43, the wired data transmission channel 40 as shown in FIG. 1 is formed by the projector data transfer interface 13, the data transmission cable 43 and the data transfer interface 72. The electronic equipment 60 includes the CPU 63, the graphics processor 64 and the image transmission interface 66. The CPU 63 is electrically connected to the graphics processor 64, the graphics processor 64 is electrically connected to the image transmission interface 66, and the image transmission interface 66 is connected to the image transmission interface 73 through the image transmission cable 33. The image transmission channel 30 shown in FIG. 1 is formed by the projector image transmission interface 12, the image transmission cable 32, and the image transmission interface 71.

In the third embodiment, the picture is transmitted from the electronic equipment 60 to the processing device 20b for performing the keystone correction on the picture. In detail, the processor 11 in the projector 10 generates the keystone correction parameters, and transmits the keystone correction parameters to the processing device 20b of the CPU 74 through the projector data transfer interface 13, the data transmission cable 43 and the data transfer interface 72 sequentially, and then the CPU 74 transmits the keystone correction parameters to the graphics processor 75. The CPU 63 in the electronic equipment 60 transmits the picture to the graphics processor 64. The graphics processor 64 receives the instructions from the CPU 63 and transmits the picture to the graphics processor 75 of the processing device 20b through the image transmission interface 66, the image transmission cable 33, and the image transmission interface 73 in sequence. The graphics processor 75 performs the keystone correction on the received picture according to the keystone correction parameters and generates a corrected picture and then transmits the corrected picture to the processor 11 of the projector 10 through the image transmission interface 71, the image transmission cable 32, and the projector image transmission interface 12 in sequence. The processor 11 projects the corrected picture on the projection screen 50 through the projection lens 14 to present a standard rectangular picture.

Figure 6:
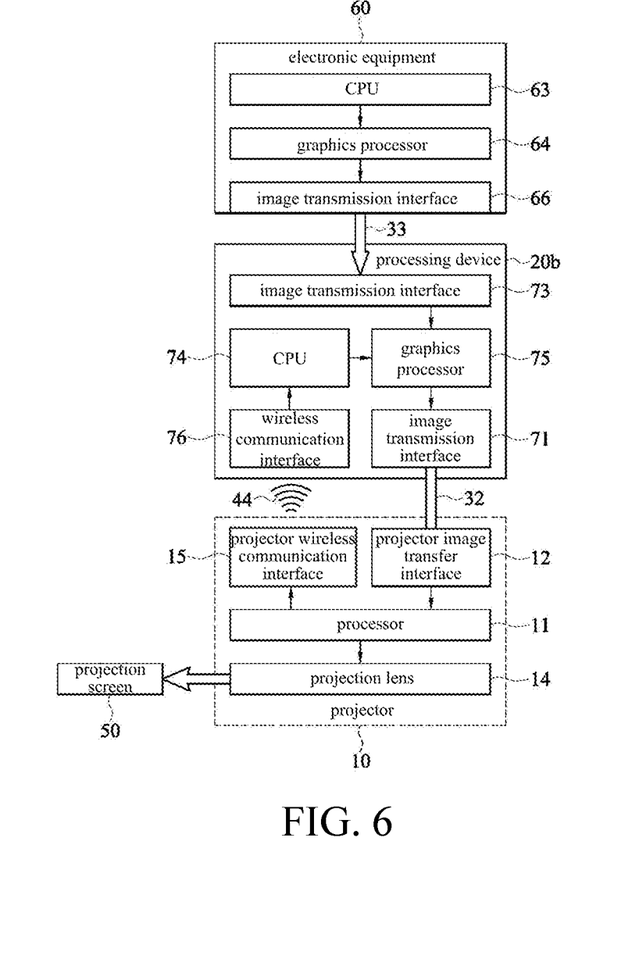
FIG. 6 is a block diagram of the projection picture correction system according to a fourth embodiment.

Please refer to the fourth embodiment shown in FIG. 6, the structure of the projector 10 is the same as the second embodiment, which will not be repeated here. A processing device 20b includes an image transmission interface 71, a wireless communication interface 76 used as the data transfer interface, an image transmission interface 73, a CPU 74, and a graphics processor 75. The CPU 74 is electrically connected to the wireless communication interface 76 and the graphics processor 75, and the graphics processor 75 is electrically connected to the image transmission interface 71 and the image transmission interface 73. The image transmission interface 71 is connected to the projector image transmission interface 12 through the image transmission cable 32, the wireless communication interface 76 is connected to the projector wireless communication interface 15 of the projector 10 through the wireless communication connection channel 44, and the wireless data transmission channel 40 as shown in FIG. 1 is formed by the projector wireless communication interface 15, the wireless communication connection channel 44 and the wireless communication interface 76. The structure and connection relationship of the electronic equipment 60 are the same as those of the third embodiment, so they are not repeated here. As shown in FIG. 6, the processing device 20b forms the image transmission channel 30 as shown in FIG. 1 by the image transmission interface 71, the image transmission cable 32, and the projector image transmission interface 12, and the image transmission channel 30 is configured to transmit picture. The projector wireless communication interface 15 of the projector 10 and the wireless communication interface 76 of the processing device 20b are paired or configured to establish the wireless communication connection channel 44 according to a wireless communication standard.

The processor 11 in the projector 10 transmits the keystone correction parameters generated by the operation to the CPU 74 of the processing device 20b through the projector wireless communication interface 15, the wireless communication connection channel 44 and the wireless communication interface 76 sequentially, and then the CPU 74 transmits the keystone correction parameters to the graphics processor 75. Then the CPU 63 in the electronic equipment 60 transmits the picture to the graphics processor 64, the graphics processor 64 receives the instructions from the CPU 63 to transmit the pictures to the graphics processor 75 of the processing device 20b through the image transmission interface 66, the image transmission cable 33, and the image transmission interface 73 in sequence. The graphics processor 75 performs the keystone correction on the received picture according to the keystone correction parameters, generates the corrected picture, and transmits the corrected picture to the processor 11 of the projector 10 through the image transmission interface 71, the image transmission cable 32, and the projector image transmission interface 12 in sequence, and then the processor 11 projects the corrected picture on the projection screen 50 by the projection lens 14.

As shown in FIG. 3 to FIG. 6, in an embodiment, the projector image transmission interface 12, the image transmission interface 61, the image transmission interface 71, the image transmission interface 73, and image transmission interface 66 are but not limited to high-definition multimedia interface (HDMI), digital video interface (DVI), DisplayPort, D-sub, USB, composite video connector, or component video connector, and the image transmission cables 31, 32, and 33 are corresponding to the image transmission interface. In an embodiment, the projector image transmission interface 12, the image transmission interface 61, the image transmission interface 71, the image transmission interface 73, or the image transmission interface 66 is the wireless communication interface, and the wireless communication interface is paired or configured to establish the wireless communication connection channel according to a wireless communication standard. In an embodiment, the wireless communication standard is, Bluetooth or Wi-Fi, but is not limited thereto. In an embodiment, the projector data transfer interface 13, the data transfer interface 62, or the data transfer interface 72 is, but are not limited to, a USB port or a universal asynchronous transceiver (UART) port, and the data transmission cables 41 and 43 are, but not limited to, USB transmission lines or UART transmission lines.

In an embodiment, the projector image transmission interface 12 and the projector data transfer interface 13 are integrated into one transmission interface (such as a USB Type-C connector) that simultaneously transmits images (such as the corrected picture) and data (such as the keystone correction parameters). In an embodiment, the image transmission interface 61 and the data transfer interface 62 are integrated into one transmission interface (such as a USB Type-C connector) that simultaneously transmits images (such as the corrected picture) and data (such as the keystone correction parameters). In an embodiment, the image transmission interface 71 and the data transfer interface 72 are integrated into one transmission interface (such as a USB Type-C connector) that simultaneously transmits images (such as the corrected picture) and data (such as the keystone correction parameters).

Figure 7:
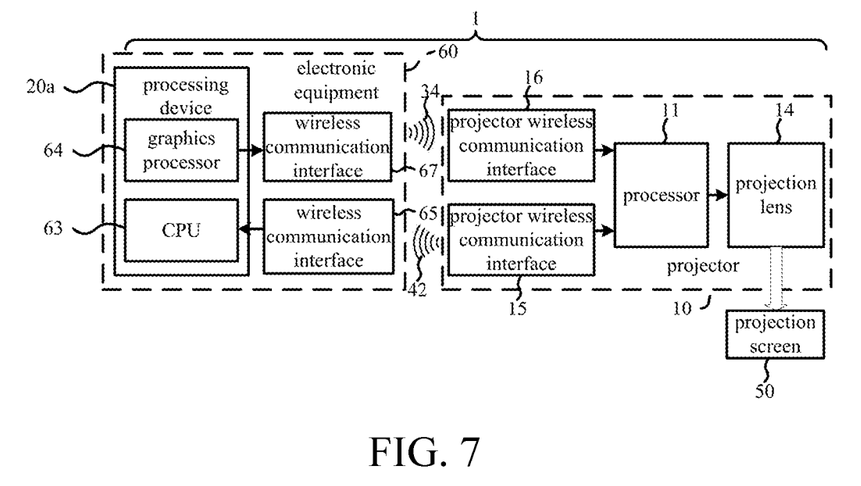
FIG. 7 is a block diagram of the projection picture correction system according to a fifth embodiment.

When the projector image transmission interface 12 and the image transmission interface 61 are the wireless communication interface, referring to an fifth embodiment shown in FIG. 7, a projector 10 includes a processor 11, a projector wireless communication interface 16 used as the image transmission interface, a projector wireless communication interface 15 used as the data transfer interface, and a projection lens 14. An electronic equipment 60 includes a processing device 20a, a wireless communication interface 67 used as the image transmission interface, and a wireless communication interface 65 used as the data transfer interface. The CPU 63 in the processing device 20a is electrically connected to the graphics processor 64 and the wireless communication interface 65, and the graphics processor 64 is electrically connected to the wireless communication interface 67. When the projector wireless communication interface 16 is connected to the wireless communication interface 67 of the electronic equipment 60 through the wireless communication connection channel 34, the wireless the image transmission channel 30 as shown in FIG. 1 is formed by the wireless communication interface 67, the wireless communication connection channel 34 and the projector wireless communication interface 16. When the projector wireless communication interface 15 is connected to the wireless communication interface 65 of the electronic equipment 60 through the wireless communication connection channel 42, the wireless data transmission channel 40 as shown in FIG. 1 is formed by the projector wireless communication interface 15, the wireless communication connection channel 42 and the wireless communication interface 65. In one embodiment, when the projector wireless communication interface 15 and the projector wireless communication interface 16 are integrated into the same wireless communication interface. The wireless communication interface 65 and the wireless communication interface 67 are also integrated into the same wireless communication interface.

Figure 8:
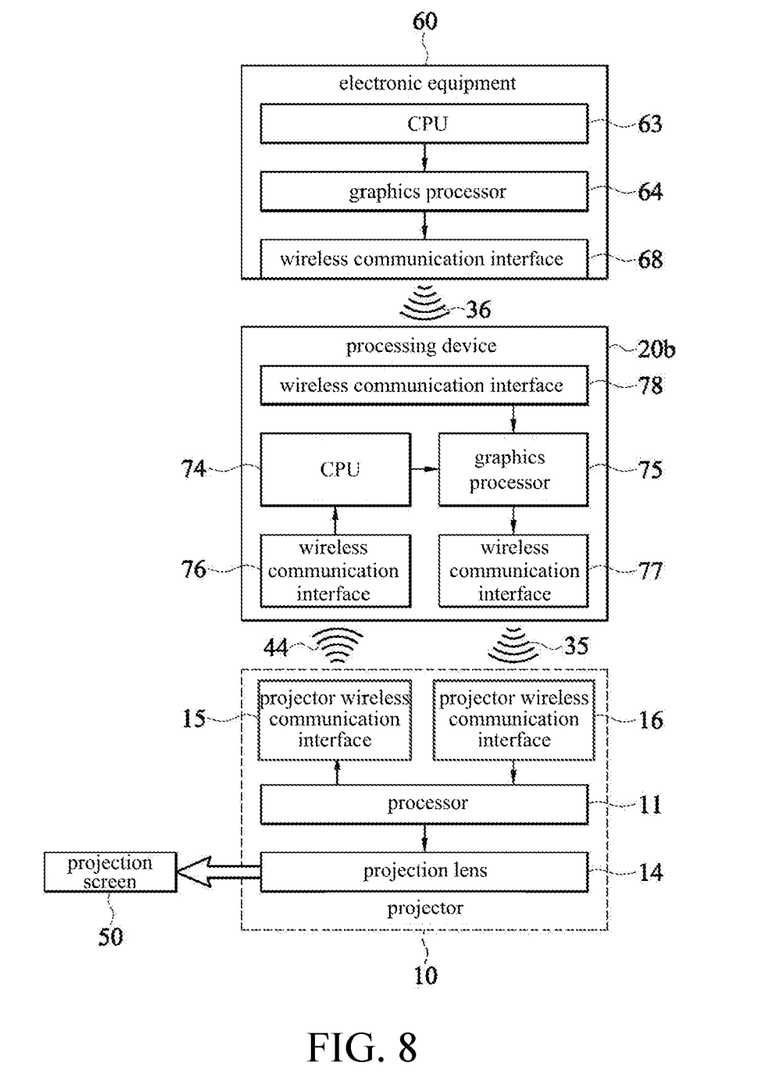
FIG. 8 is a block diagram of the projection picture correction system according to a sixth embodiment.

When all the image transmission interfaces are the wireless communication interfaces, please refer to the sixth embodiment shown in FIG. 8. The structure of the projector 10 is the same as the fifth embodiment, so it will not be repeated here. A processing device 20b includes a wireless communication interface 77 used as the image transmission interface, a wireless communication interface 76 used as the data transfer interface, a wireless communication interface 78 used as the image transmission interface, a CPU 74, and a graphics processor 75. The CPU 74 is electrically connected to the wireless communication interface 76 and the graphics processor 75, and the graphics processor 75 is electrically connected to the wireless communication interface 77 and the wireless communication interface 78. The wireless communication interface 77 is connected to the projector wireless communication interface 16 through the wireless communication connection channel 35, the wireless communication interface 76 is connected to the projector wireless communication interface 15 through the wireless communication connection channel 44, and the wireless data transmission channel 40 as shown in FIG. 1 is formed by the projector wireless communication interface 15, the wireless communication connection channel 44, and the wireless communication interface 76 to transmit the keystone correction parameters. The electronic equipment 60 includes the CPU 63, the graphics processor 64 and the wireless communication interface 68. The CPU 63 is electrically connected to the graphics processor 64, the graphics processor 64 is electrically connected to the wireless communication interface 68, and the wireless communication interface 68 is connected to the wireless communication interface 78 of the processing device 20b through the wireless communication connection channel 36, and therefore, the electronic equipment 60 transmits the picture to the processing device 20b through the wireless communication interface 68 and the wireless communication connection channel 36. As shown in FIG. 8, the processing device 20b forms the image transmission channel 30 as shown in FIG. 1 by the wireless communication interface 77, the wireless communication connection channel 35, and the projector wireless communication interface 16, to transmit the corrected picture through the image transmission channel 30. In one embodiment, the projector wireless communication interface 15 and the projector wireless communication interface 16 are integrated into the same wireless communication interface. The wireless communication interface 76 and the wireless communication interface 77 are also integrated into the same wireless communication interface.

In some embodiments, the keystone correction parameters provided by the processor of the projector includes keystone correction values of the on-screen display (OSD) or a correction sensing value of an orientation sensor (such as a gravity sensor (G-sensor)) in the projector, which is not limited herein.

Therefore, the projection picture correction system in this disclosure uses the external processing device with a faster processing speed independent of the projector to perform the keystone correction on the picture. The projector is configured to output the keystone correction parameters and receive the corrected picture without performing the keystone correction. Therefore, it avoids screen delays during the projector's projection and increase the smoothness of the projection picture.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A projection picture correction system, comprising:
   a projector, configured to provide keystone correction parameters; and
   a processing device, connected with the projector through a data transfer interface to receive the keystone correction parameters from the projector, the processing device performs a keystone correction on at least one picture according to the keystone correction parameters and generates a corrected picture, and transmits the corrected picture to the projector through an image transmission interface, for projection;
   wherein the processing device is further electrically connected to an electronic equipment, the electronic equipment transmits the picture to the processing device, wherein the processing device is independent of the electronic equipment, and the processing device includes the data transfer interface and the image transmission interface.

2. The projection picture correction system according to claim 1, wherein the processing device further comprises:
   a central processing unit (CPU), receiving the keystone correction parameters through the data transfer interface; and
   a graphics processor, electrically connected to the CPU, to perform a keystone correction on the picture according to the keystone correction parameters of the picture, and transmit the corrected picture to the projector through the image transmission interface.

3. The projection picture correction system according to claim 1, wherein the electronic equipment further comprises:
   a central processing unit (CPU); and
   a graphics processor, electrically connected to the CPU, the graphics processor transmits the picture to the processing device for performing the keystone correction according to the instructions of the CPU.

4. The projection picture correction system according to claim 1, wherein the data transfer interface and the image transmission interface are connecting ports or wireless communication interfaces.

5. A projector, adapted to be used with a processing device, the projector comprising:
   a projection lens;
   a processor, electrically connected to the projection lens, and configured to generate keystone correction parameters;
   a data transfer interface, electrically connected to the processor; and
   an image transmission interface, electrically connected to the processor;
   wherein, the processor is connected to the processing device through the data transfer interface and transmits the keystone correction parameters to the processing device, the processing device performs a keystone correction on at least one picture and generates a corrected picture according to the keystone correction parameters, and the processor is connected to the processing device through the image transmission interface to receive the corrected picture from the processing device and transmits the corrected picture to the projection lens for projection;
   wherein the processing device is further electrically connected to an electronic equipment, the electronic equipment transmits the picture to the processing device, and the processing device is independent of the electronic equipment.

6. The projector according to claim 5, wherein the processing device further comprises:
   a CPU, receiving the keystone correction parameters through the data transfer interface; and
   a graphics processor, electrically connected to the CPU, to perform a keystone correction on the picture according to the keystone correction parameters, and transmit the corrected picture to the projector through the image transmission interface.

7. The projector according to claim 5, wherein the data transfer interface and the image transmission interface are connecting ports or wireless communication interfaces.

* * * * *